United States Patent [19]
Shaffer

[11] 3,864,257
[45] Feb. 4, 1975

[54] METHOD AND APPARATUS FOR SURFACE SKIMMING

[75] Inventor: Robert L. Shaffer, Olathe, Kans.

[73] Assignee: Ecodyne Corporation, Lincolnshire, Ill.

[22] Filed: Sept. 17, 1973

[21] Appl. No.: 398,289

[52] U.S. Cl.................... 210/83, 210/65, 210/525, 210/528
[51] Int. Cl............................................ B01d 21/00
[58] Field of Search ............ 210/51, 107, 221, 298, 210/523, 527, 528, 529, 530, 538, 83, 65, 525; 15/246.5, 256.5; 55/228

[56] References Cited
UNITED STATES PATENTS

| | | | |
|---|---|---|---|
| 2,149,313 | 3/1939 | Sayers et al.......................... | 210/525 |
| 2,681,151 | 6/1954 | Coulter................................. | 210/57 |
| 2,780,361 | 2/1957 | Evans et al. ..................... | 210/525 X |
| 2,854,146 | 9/1958 | Nebolsine et al................... | 210/525 |
| 3,437,212 | 4/1969 | Thorn et al......................... | 210/525 |
| 3,741,399 | 6/1973 | Peterson ............................. | 210/525 |

*Primary Examiner*—Theodore A. Granger
*Attorney, Agent, or Firm*—Joel E. Siegel; Charles M. Kaplan

[57] ABSTRACT

A surface skimming method and apparatus for circular clarifiers which collects and removes floating matter from the surface of the clarifier. The surface skimmer includes a rotating arm, a fixed anti-rotation arm, and means for removal of collected floating matter. The rotating arm projects above the surface of the clarifier for rotation thereabout pushing the floating matter ahead of it. As the rotating arm approaches the anti-rotation arm, a "wedge" is formed therebetween which traps the floating matter. As the rotating arm continues to rotate, the "wedge" is made smaller and moves outward, forcing the floating matter towards the means for removal of the collected floating matter.

8 Claims, 4 Drawing Figures

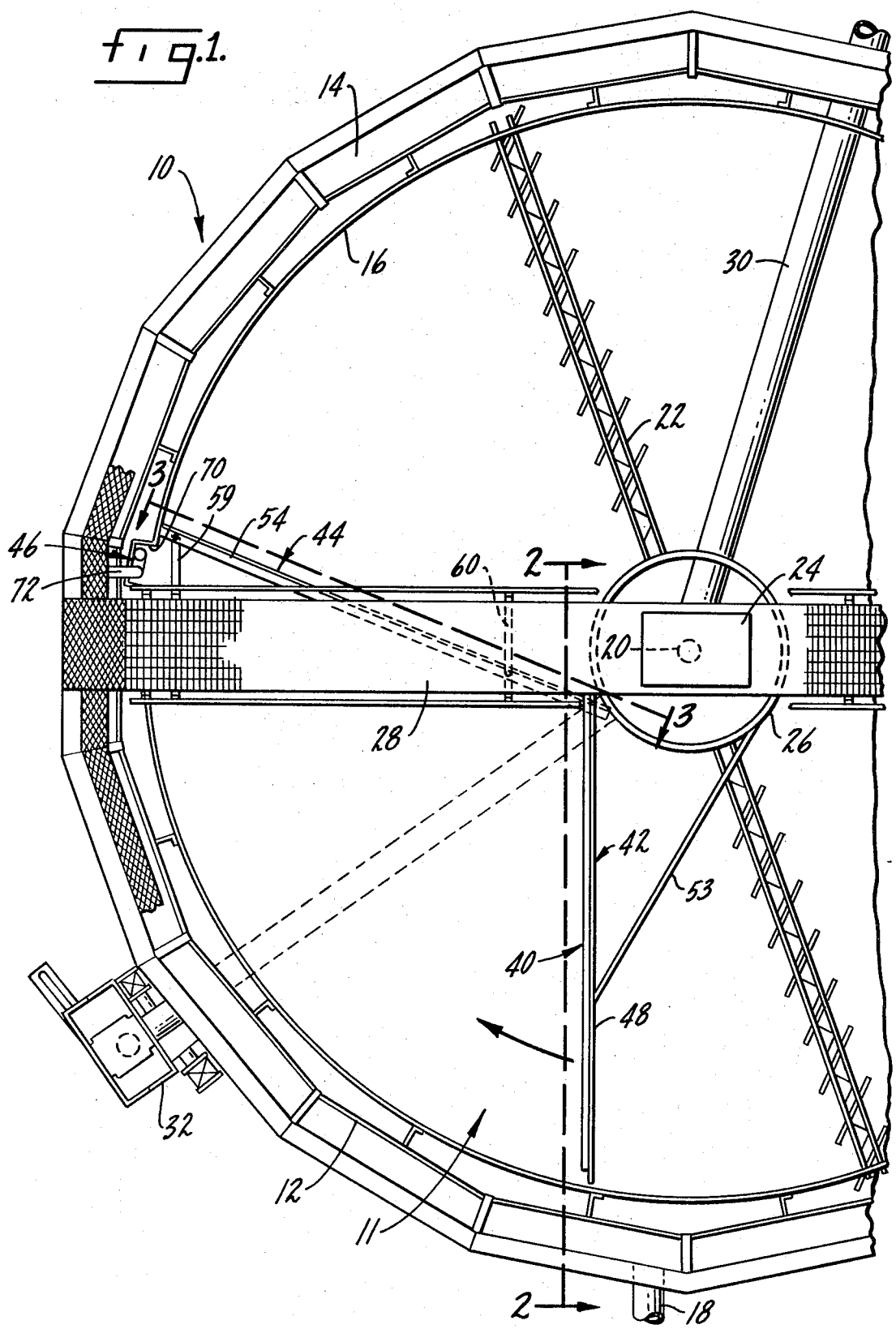

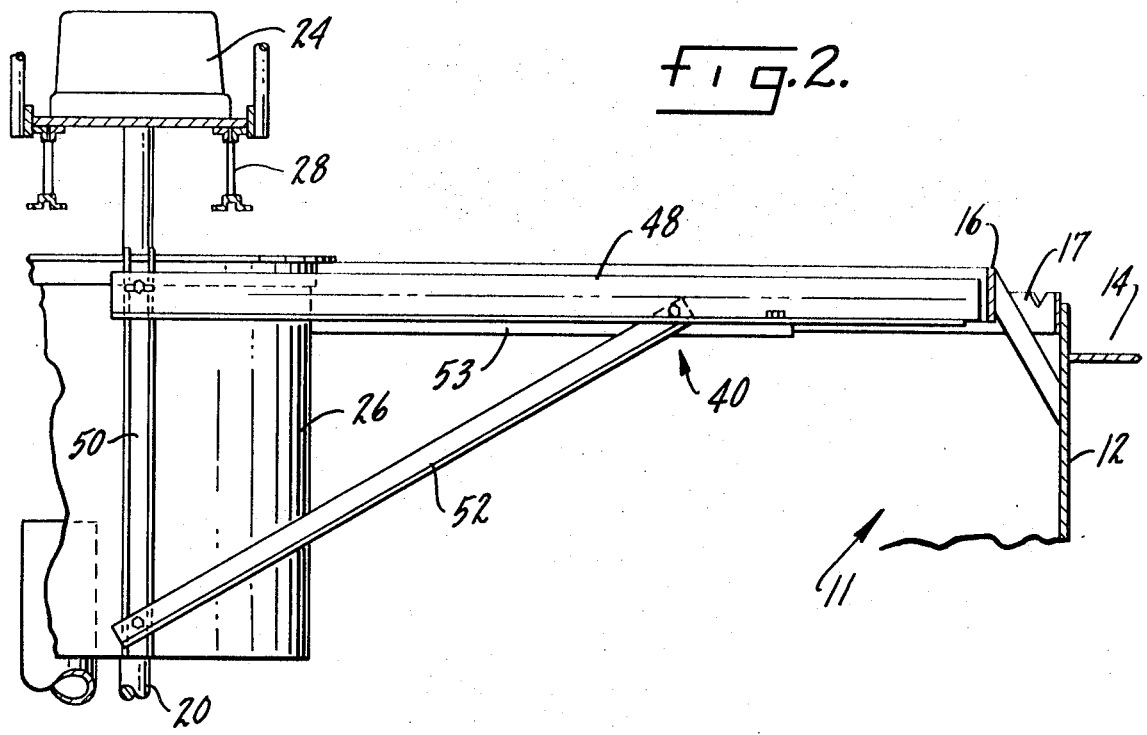
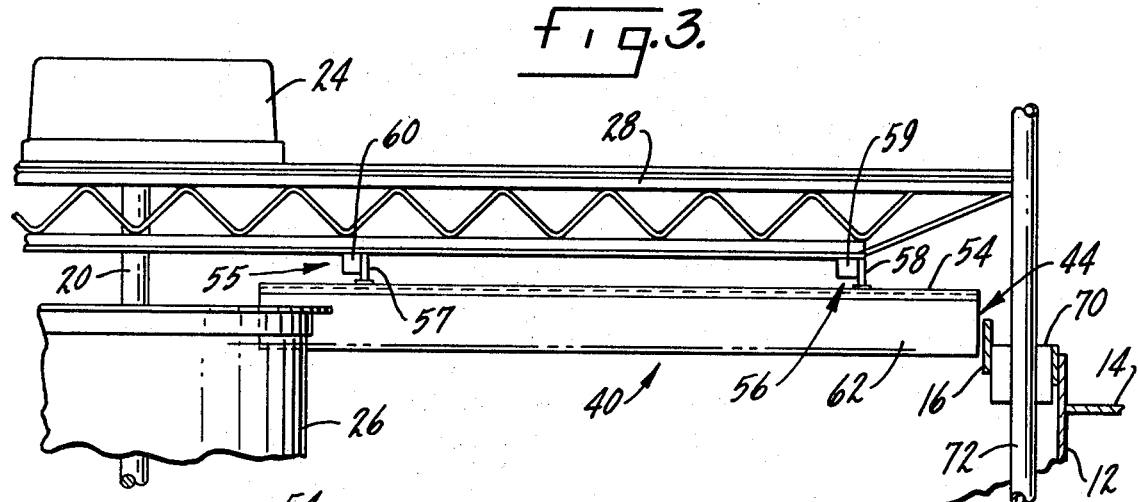
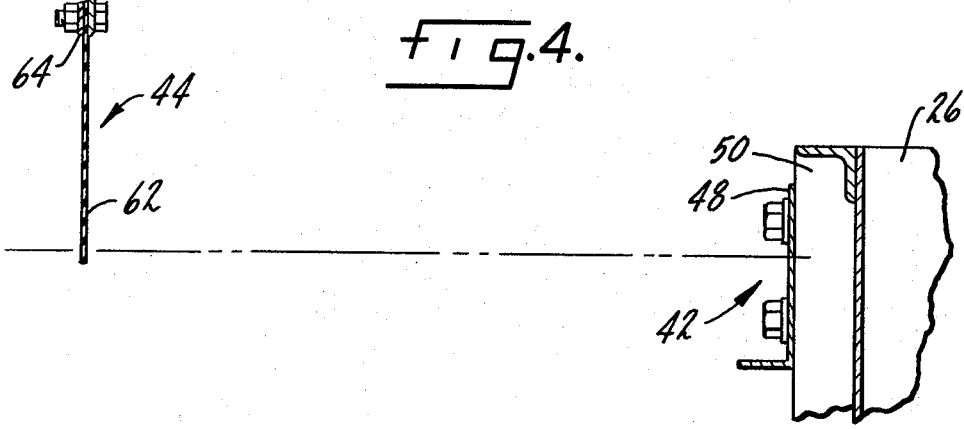

METHOD AND APPARATUS FOR SURFACE SKIMMING

BACKGROUND OF THE INVENTION

This invention relates in general to clarifiers, and more particularly to circular clarifiers of the type used in sewage and industrial waste treatment systems and in industrial process systems. It deals specifically with a surface skimming system for circular clarifiers which collects and removes floating matter from the surface of the clarifier.

In a typical sewage or industrial waste treatment system, a clarifier tank normally defines one stage in a multi-stage treatment operation. The clarifier tank receives a "mixed liquor" from an initial stage aeration tank. Solids are separated from the liquid by settling in the clarifier, and the liquid is removed as effluent from the system and disposed of. Sludge comprising the accumulated solids is ordinarily removed to use in the next aeration stage of the sewage treatment.

As the solids separate from the effluent by settling in the clarifier tank, very light solids tend to float to the top of the liquid and form a scum on its surface. While this portion of floating matter is small, it creates an unsightly and smelly mess if allowed to accumulate. This scum, therefore, must be collected from the liquid surface and discharged from the tank. It is well known to use a scum baffle arrangement to contain the scum which has a tendency to flow over the effluent weir and contaminate the discharge effluent.

A number of surface skimming systems have been heretofore devised to solve this problem. Virtually all incorporate a slowly rotating arm which sweeps the surface of the clarifier. One such system adds to this arm a slightyly submerged airlift at one point on the periphery. The theory is that the rotating arm will sweep all floating matter outward where it will be carried around to the airlift and be removed. Several problems are encountered with this type of system. One is that the floating matter generally will not be swept outward, but will maintain its initial radial position and accumulate in front of the rotating arm. The airlift can then dispose of only the outermost portion of the floating matter. With this type of system, it is not unusual for the entire clarifier, except for a small ring around the outside, to be covered with scum. Another problem with this type of system is that it pumps an excessive quantity of water, which increases the clarifier upflow rate. If flow is diverted into the digester of the treatment plant, as is desired, the excess water must be decanted out.

Another heretofore known surface skimming system utilizes a rotating arm and a fixed, mostly submerged trough running from near the center to the outer edge of the clarifier. The trough is constructed so that water and floating matter can be pushed into it by the rotating arm. Generally, an airlift is used to pump water, and floating matter from the trough. The problems encountered with this system are that it pumps an excessive amount of water, even when operated intermittently, due to the length of the trough which must be flushed of solids, and that the trough is difficult and expensive to fabricate and install.

SUMMARY OF THE INVENTION

Accordingly, it is an object of the present invention to provide a simple economical and reliable method and apparatus for removing floating matter from the surface of a circular clarifier.

Another object of the invention is to provide a surface skimming system for circular clarifiers which sweeps the floating matter outward where it can be carried around to an airlift and be removed. A further object is to provide a surface skimming system for circular clarifiers which does not pump an excessive quantity of water and therefore does not materially increase the clarifier upflow rate.

A still further object of the present invention is to provide such a surface skimming system which is a simple, economical, and reliable means of removing floating matter from the surface of the clarifier.

These and other objects are realized in accordance with the present invention by providing a surface skimming system which in its simplest form includes a rotating arm, a fixed anti-rotation arm, and an airlift pumping device. The rotating arm is mounted tangentially to a rotating stilling well or a suitable centrally disposed shaft and positioned so that it projects above the surface of the clarifier. The anti-rotation arm is positioned so that it breaks the surface of the clarifier. The bottom portion of the anti-rotation arm is of a flexible material, such as rubber, so that it may deflect and allow the rotating arm to pass under it. The airlift is positioned under the outer periphery thereof, so that it draws water from the surface. The rotating arm sweeps the surface of the clarifier, pushing the floating matter ahead of it. As the rotating arm approaches the fixed anti-rotation arm, a "wedge" is formed therebetween which traps the floating matter. As the rotating arm continues to rotate, the "wedge" is made smaller and moves outward, forcing the floating matter to the airlift pump which removes it along with some water.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 1 is a fragmentary plan view of a typical clarifier tank incorporating the surface skimming system of the present invention;

FIG. 2 is a sectional view taken along line 2—2 in FIG. 1;

FIG. 3 is a sectional view taken along line 3—3 in FIG. 1; and

FIG. 4 shows end views of the rotating arm and the anti-rotation arm positioned with respect to one another to show their relative elevations.

DESCRIPTION OF A PREFERRED EMBODIMENT

Referring to FIGS. 1-4, a portion of a sewage treatment clarifier is illustrated generally at 10. The clarifier 10 includes a tank 11 having a generally circular cylindrical outer wall 12 which is provided with an effluent trough 14 and a scum baffle 16 both of which are of well known construction. The effluent trough 14 slopes to a plant outlet pipe 18 for removal of clarified liquid from tank 11. From the center of the tank bottom, there rises a drive shaft 20 supporting a sludge scraper assembly 22 of conventional construction for rotation therewith. A drive assembly 24 is connected to shaft 20 in a well known manner to rotate shaft 20 and a sludge scraper assembly 22. A stilling well assembly 26 is secured to shaft 20 at an upper portion thereof for rotation therewith. A walkway 28 extends across the upper edge of tank 11 to permit access to the center of tank 11 and to support the drive assembly 24 thereabaove. A clarifier inlet pipe 30 supplies raw wastewater or mixed liquor into stilling well assembly 26.

In operation, wastewater or sewage, which has been aerated and mixed with activated sludge, enters the stilling well assembly 26 through inlet pipe 30 and flows into tank 11. In tank 11, the solid material, or sludge, settles to the bottom of the tank 11 where it is removed to a central hopper (not shown) and withdrawn by a sludge return airlift assembly 32. The liquid in the clarifier, free of settleable solids, overflows an adjustable weir 17 into the effluent trough 14 which slopes to the plant outlet pipe 18. The sludge removed from the clarifier is conditioned for future mixture with incoming wastewater or sewage.

As the solids settle in the clarifier tank 11, very light solids tend to float to the top of the liquid and form a scum on its surface. This scum must be collected from the liquid surface and discharged from the tank to prevent its contamination of the clarifier effluent and to remove the unsightly and smelly mess for environmental reasons. Scum baffle 16, of well known construction, prevents the scum from entering the effluent trough 14, but does not eliminate accumulated layers of scum on the surface of the liquid. For this purpose, a unique surface skimming system indicated generally at 40, is provided which will hereinbelow be discussed with the requisite detail. Surface skimming system 40 includes a surface skimming rotating arm 42, a fixed anti-rotation arm 44, and a surface skimmer airlift pump assembly 46. Surface skimming arm 42 is formed from an angle iron member 48 which extends radially outward from stilling well 26 to a point just short of baffle 16, as best seen in FIGS. 1-2. Member 48 is bolted at its inner end to a vertical brace member 50 which in turn is bolted to stilling well 26. A vertical skimmer arm brace 52 is bolted at one end to a central portion of the vertical leg of member 48 and at its other end to a lower portion of brace member 50, as best seen in FIG. 2. A horizontal skimmer arm brace 53 is bolted at one end to the horizontal leg of member 48 and at its other end to an upper portion of stilling well 26, as best seen in FIGS. 1-2.

Anti-rotation arm 44 includes an angle iron member 54 which extends radially outward from stilling well 26 to a point just short of baffle 16 at an elevation above the elevation of member 48. Member 54 is rigidly supported from walkway 28 by supporting structures 55 and 56. Supporting structures 55 and 56 include vertical threaded supporting rods 57 and 58 which are respectively received at their upper ends by horizontal braces 59 and 60 associated with walkway 28 and at their lower ends at the horizontal leg of the inner and outer ends of member 54. The elevation of member 54 may be adjusted by changing the length of the rods 57 and 58 between the respective braces 59 and 60 and the ends of member 54. Anti-rotation arm 44 also includes a flexible bottom strip 62 made from a flexible material such as rubber, which is sandwiched along its upper edge between the vertical leg of member 54 and plate 64. Strip 62 extends downward to an elevation below the upper edge of skimming arm 42, as best seen in FIG. 4.

Surface skimmer airlift pump assembly 46 includes a collection box 70 extending into baffle 16 which recieves a U-tube type airlift pump 72 of any well known construction. Airlift 46 is positioned just under the surface of the clarifier so that it draws water from the surface. U-tube 72 is preferably mounted to a wall of trough 14 in a manner which allows for vertical adjustment of the inlet end thereof so as to permit compensation for varying liquid levels. The present invention contemplates the use of other means well known in the art for the removal of the scum collected in box 70.

In operation, the rotating arm 42 sweeps the surface of the liquid in tank 11 in the direction indicated by the arrow in FIG. 1, pushing the floating matter ahead of it. As arm 42 approaches the fixed anti-rotation arm 44, a wedge is formed therebetween which traps the floating matter. As arm 42 continues to rotate, the wedge is made smaller and simultaneously moves outward, forcing the floating matter into collection box 70 which is positioned in baffle 16 just ahead of the outer end of arm 44. This matter is removed from box 70 by airlift pump 46 or any other well known means which may be provided for the removal of the matter from box 70. Bottom strip 62 of arm 44 being of flexible material deflects and allows arm 42 to pass under it to continue its rotation around the tank and thereby repeat the above described operation.

In clarifier designs which do not include stilling wells, it is necessary to alter the support of arms 42 and 44 and/or change the shape of arms 42 and 44 in order to achieve a wedge which becomes smaller and moves outward as arm 42 approaches arm 44. By way of example, this result may be achieved by securing arm 42 directly to the rotating shaft 20 while providing arm 42 with a backward curved surface and arm 44 with a forward curved surface. As will be appreciated by those skilled in the art, numerous other designs of arms 42 and 44 will also provide the result taught by the present invention.

Obviously many modifications and variations of the present invention are possible in the light of the above teachings. For example, the present invention contemplates the provision of a flexible portion to the rotating arm to permit it to pass either under or over the anti-rotation arm as it moves around the tank. It is, therefore, to be understood that, within the scope of the appended claims, the invention may be practiced otherwise than as specifically described.

What is claimed is:

1. In combination with a circular tank adapted to receive liquid, means for removing floating matter from the surface of the liquid, said means comprising:
   a. a surface skimming arm positioned within said tank for rotation about a centrally disposed vertical axis so as to push the floating matter ahead of it; and
   b. an anti-rotation arm radially affixed within said tank, said skimming arm and said anti-rotation arm forming a wedge therebetween which becomes smaller and moves outward as said skimming arm approaches said anti-rotation arm so as to direct said floating matter trapped therein outward towards the periphery of said tank.

2. The invention as defined in claim 1 further including scum removal means associated with the outer periphery of the tank for receiving the outward moving floating matter collected in said wedge for removal thereof from the tank.

3. The invention as defined in claim 2 wherein said scum removal means is an airlift pump.

4. The invention as defined in claim 2 wherein the bottom portion of said anti-rotation arm deflects to permit said skimming arm to pass thereunder.

5. A method for removing floating matter from the surface of a liquid within a circular tank, comprising the steps of: rotating a skimming arm along the surface of the liquid about a centrally disposed substantially verticle axis to push the floating matter ahead of it; and directing the floating matter outward towards the periphery of the tank by positioning a fixed anti-rotation arm along the surface of the liquid to form a wedge between it and the skimming arm which traps the floating matter therein and and becomes smaller and moves outward as the skimming arm approaches the anti-rotation arm.

6. The method as defined in claim 5 including the step of directing the floating matter to scum removal means for removal from the tank.

7. The method as defined in claim 6 wherein said scum removal means is an airlift pump.

8. The method as defined in claim 6 wherein the bottom portion of the anti-rotation arm deflects to permit the skimming arm to pass under it.

* * * * *